(12) United States Patent
Grund (10) Patent No.: US 9,689,738 B1
(45) Date of Patent: Jun. 27, 2017

(54) METHOD AND APPARATUS FOR OFFSET FREQUENCY SEPARATION AND DROP OUT MITIGATION IN NON-CONTACT VIBROMETRY

(71) Applicant: LightWorks II, LLC, Longmont, CO (US)

(72) Inventor: Christian J. Grund, Boulder, CO (US)

(73) Assignee: LIGHTWORKS II, LLC, Longmont, CO (US)

( * ) Notice: Subject to any disclaimer, the term of this patent is extended or adjusted under 35 U.S.C. 154(b) by 157 days.

(21) Appl. No.: 14/685,254

(22) Filed: Apr. 13, 2015

Related U.S. Application Data

(60) Provisional application No. 61/979,271, filed on Apr. 14, 2014.

(51) Int. Cl.
*G01H 9/00* (2006.01)
(52) U.S. Cl.
CPC .................................. *G01H 9/00* (2013.01)
(58) Field of Classification Search
CPC . G01H 9/00; G01V 1/005; G01V 1/30; G01V 1/36; G01V 1/18; G01V 1/20; G01V 1/37
See application file for complete search history.

(56) References Cited

U.S. PATENT DOCUMENTS

| | | | | | |
|---|---|---|---|---|---|
| 4,782,446 | A | * | 11/1988 | Ehler | G01V 1/04 367/190 |
| 4,875,166 | A | * | 10/1989 | Carroll | G01V 1/364 367/44 |
| 5,671,136 | A | * | 9/1997 | Willhoit, Jr. | G01V 1/30 702/18 |
| 2009/0010103 | A1 | * | 1/2009 | Sallas | G01V 1/005 367/41 |
| 2009/0241673 | A1 | * | 10/2009 | Kondo | G01N 29/0672 73/625 |
| 2010/0195439 | A1 | * | 8/2010 | Muyzert | G01V 1/20 367/56 |
| 2011/0222371 | A1 | * | 9/2011 | Liu | G01V 13/00 367/76 |
| 2013/0163381 | A1 | * | 6/2013 | Sallas | G01V 1/005 367/41 |
| 2013/0201799 | A1 | * | 8/2013 | Meunier | G01V 1/143 367/189 |
| 2014/0283615 | A1 | * | 9/2014 | Laws | G01V 1/005 73/662 |
| 2015/0122034 | A1 | * | 5/2015 | Maki | H02M 3/158 73/649 |
| 2015/0160012 | A1 | * | 6/2015 | Il | G01C 19/5776 73/504.12 |

* cited by examiner

*Primary Examiner* — Helen Kwok
(74) *Attorney, Agent, or Firm* — Perkins Coie LLP (57) ABSTRACT

The present technology is directed to apparatuses, systems, and methods for improving the performance of non-contact vibrometers in the presence of platform motion and speckle noise. In addition, systems and methods are described that allow intentional frequency displacement of heterodyne and/or homodyne vibrometer returns to enable disambiguation of the sign of the vibration direction in the presence or absence of platform motion.

20 Claims, 10 Drawing Sheets

METHOD AND APPARATUS FOR OFFSET FREQUENCY SEPARATION AND DROP OUT MITIGATION IN NON-CONTACT VIBROMETRY

CROSS-REFERENCE

The present application claims priority to U.S. Provisional Patent Application 61/979,271, filed Apr. 14, 2014, the disclosure of which is incorporated herein by reference in its entirety.

TECHNICAL FIELD

The present technology relates generally to vibrometry and, more particularly, to non-contact vibrometers in the presence of platform motion and speckle noise.

BACKGROUND

Vibrometers can use passive or active means to illuminate a target and detect the target vibration by observing the phase modulation of the illumination scattered by the target relative to some phase reference. Emissions from the target may also be used in this way, either in response to illumination, or self-generated due to some physical property of the target. Optical, RF, or acoustic means can be employed, but typically optical means are used because the beams can easily be shaped and directed with precision, and the small wavelength leads to high phase modulation sensitivity for small target vibrations.

Typical vibrometers are subject to many signal degradations. Primary among these are relative motion between the vibrometer and the target (platform motion) that causes a Doppler shift of the frequency of the signal return, and speckle noise that can cause rapid dropouts due to interference between returns from different scattering elements of the illuminated target surface. In addition, the vibrometer can use a heterodyne architecture where the reference phase is obtained from a signal that is intentionally displaced in frequency from the probe illumination signal, and/or a homodyne architecture where the reference phase is derived from the transmitted illumination signal. The latter architecture has the advantage of lower cost, greater ruggedness potential, and simplicity, but has the disadvantage that there is an ambiguity in phase when there is no platform motion (i.e. at zero platform velocity, it is not apparent from the signal whether the vibrating surface is advancing or retreating relative to the vibrometer) that can lead to harmonic distortions.

Further, for either architecture, there is a limitation on the unambiguous amplitude that can be measured by phase detection alone because the transcendental functions that compose the motion are periodic on $2\pi$, leading to a folding of the phase retrieval space. The latter can be easily addressed for a single frequency vibration signal by standard unwrapping techniques, but in the general case, the vibration is more complex with many different frequency elements each having a uniquely varying phase.

SUMMARY

Systems and methods are described for vibrometry. More specifically, various embodiments of the present invention relate to a first method for processing signals associated with a plurality of vibrometry beams. The first method includes filtering each signal with a plurality of anti-aliasing filters; digitizing each signal with a plurality of analog-to-digital converters; applying amplitude correction to each digitized signal; removing portions of each digitized signal that are corrupted; transforming each digitized signal to the spectral domain; combining the spectral domain signals associated with the plurality of vibrometry beams into a single combination signal, wherein the signals are combined to mitigate signal degradations; filtering the combination signal with a spectral domain filter; transforming the combination signal with an unshifted inverse transform to generate an unshifted time domain combination signal; applying a phase shift to the combination signal; transforming the phase-shifted combination signal with a shifted inverse transform to generate a shifted time domain combination signal, wherein the shifted time domain combination signal includes spectral components shifted 90 degrees in phase from the unshifted time domain combination signal; generating an instantaneous phase angle time series based on the unshifted time domain combination signal and the shifted time domain combination signal; unwrapping the instantaneous phase angle time series to generate a continuous time-angle series; isolating vibration components of the time-angle series; generating a separated vibration signal based at least in part on the isolated vibration components; processing the separated vibration signal with a spectral equalizer and an amplitude equalizer; converting the processed vibration signal to an analog vibration signal with a digital-to-analog converter; and outputting the analog vibration signal.

Various embodiments of the present invention further relate to a second method for processing signals associated with a plurality of vibrometry beams. The second method includes filtering each signal with a plurality of anti-aliasing filters; combining the filtered signals into a single combination signal, wherein the filtered signals are combined to mitigate signal degradations; digitizing the combination signal with an analog-to-digital converters; applying amplitude correction to the digitized combination signal; removing portions of the digitized combination signal that are corrupted; transforming the digitized combination signal to the spectral domain; filtering the spectral domain combination signal with a spectral domain filter; transforming the spectral domain combination signal with an unshifted inverse transform to generate an unshifted time domain combination signal; applying a phase shift to the spectral domain combination signal; transforming the phase-shifted combination signal with a shifted inverse transform to generate a shifted time domain combination signal, wherein the shifted time domain combination signal includes spectral components shifted 90 degrees in phase from the unshifted time domain combination signal; generating an instantaneous phase angle time series based on the unshifted time domain combination signal and the shifted time domain combination signal; unwrapping the instantaneous phase angle time series to generate a continuous time-angle series; isolating vibration components of the time-angle series; generating a separated vibration signal based at least in part on the isolated vibration components; processing the separated vibration signal with a spectral equalizer and an amplitude equalizer; converting the processed vibration signal to an analog vibration signal with a digital-to-analog converter; and outputting the analog vibration signal.

Various embodiments of the present invention further relate to a third method for processing signals associated with a plurality of vibrometry beams. The third method includes filtering each signal with a plurality of anti-aliasing filters; digitizing each signal with a plurality of analog-to-digital converters; applying amplitude correction to each digitized signal; removing portions of each digitized signal that are corrupted; transforming each digitized signal to the spectral domain; filtering spectral domain signal with a plurality of spectral domain filters; transforming each spectral domain signal with a plurality of unshifted inverse transforms to generate unshifted time domain signals; applying a phase shift to each spectral domain signal; transforming each phase-shifted signal with a plurality of shifted inverse transforms to generate shifted time domain signals, wherein the shifted time domain signals include spectral components shifted 90 degrees in phase from the unshifted time domain signals; generating instantaneous phase angle time series based on each unshifted time domain signal and each corresponding shifted time domain signal; unwrapping the instantaneous phase angle time series to generate continuous time angle series; isolating vibration components of the time-angle series; generating separated vibration signals based at least in part on the isolated vibration components; processing each separated vibration signal with a plurality of spectral equalizers and a plurality of amplitude equalizers; combining the processed vibration signals associated with the plurality of vibrometry beams into a single combination signal, wherein the processed vibration signals are combined to mitigate signal degradations; converting the combination signal to an analog vibration signal with a digital-to-analog converter; and outputting the analog vibration signal.

In some examples, isolating vibration components comprises fitting the continuous time angle series to a line, wherein each point on the line represents an integral of angular frequency of an offset frequency and deviations from the line represent instantaneous frequency perturbations of the angular frequency about the line due to target vibrations. In some examples, generating the separated vibration signal comprises subtracting the portions of the continuous time angle series fit to the line from the portions of the continuous time angle series not fit to the line. In some examples, isolating vibration components comprises filtering with a high pass filter to isolate vibration components, and filtering with a low pass filter to isolate Doppler signals.

In some examples, the signals associated with the plurality of vibrometry beams comprise target vibration signals and one or more of intentional frequency offsets and unintentional frequency offsets. In some examples, one or more of the intentional frequency offsets and unintentional frequency offsets are due to at least one of a line-of-sight component of platform motion, frequency-modulated continuous-wave-like frequency modulation of a transmitted beam to a remote target, optical interference between a received signal and a reference beam, or a combination thereof. In some examples, at least one of the signals associated with the plurality of vibrometry beams comprise one or more of dropouts and phase noise. In some examples, one or more of the dropouts and phase noise are due to at least one of an interruption of the line-of-sight path between at least one vibrometer and a target, speckle fading of a return in one or more signal paths, target surface reflectivity modulations, or a combination thereof.

In some examples, the plurality of vibrometry beams are generated by separate vibrometers. In some examples, the plurality of vibrometry beams are generated by a single, multi-beam vibrometer.

In some examples, the plurality of anti-aliasing filters comprise bandpass filters configured for specific aliasing orders to allow digitization at a decimated clock rate. In some examples, the plurality of vibrometry beams detect vibration of a moving vehicle. In some examples, the methods further include down-mixing each signal prior to filtering with the plurality of anti-aliasing filters. In some examples, the amplitude correction applied to each digitized signal is based at least in part on a signal from a laser modulator. In some examples, the corrupted portions of each digitized signal are due to finite turn-around time of cyclic laser modulation waveforms. In some examples, the corrupted portions of each digitized signal are detected by monitoring the modulation waveforms. In some examples, the corrupted portions of each digitized signal are detected by monitoring the signal waveforms. In some examples, the signal degradations comprise one or more speckle and signal drop-outs.

In some examples, combining the spectral domain signals into a single combination signal includes determining signal-to-noise ratios of each spectral domain signal by comparing one or more of a highest peak power signal, a spectral signal noise floor, or a highest peak power spectral density; and selecting portions of each spectral domain signal with the lowest noise or largest signal-to-noise ratios for the combination signal. In some examples, filtering the combination signal with the spectral domain filter includes multiplying spectral elements of the combination signal by spectral weighting coefficients at each frequency to eliminate undesirable noise and interference components or accentuate critical desirable signal components. In some examples, applying the phase shift to the combination signal comprises calculating a frequency-by-frequency phase-orthogonal version of the combination signal. In some examples, generating an instantaneous phase-angle time series comprises determining an arctangent of a ratio of the unshifted time domain combination signal and the shifted time domain combination signal.

In some examples, the plurality of anti-aliasing filters are configured based at least in part on the slope of the line. In some examples, at least one of the plurality of vibrometry beams are scanned in frequency. In some examples, processing the separated vibration signal with the spectral equalizer compensates for spectral degradation caused by a secondary target or an environmental effect. In some examples, the secondary target is coupled to at least one of a human or an electro-mechanical speaker. In some examples, processing the separated vibration signal with the amplitude equalizer compresses dynamic range of the separated vibration signal. In some examples, the digital-to-analog converter converts the processed vibration signal at a rate proportional to a digitation rate of the analog-to-digital converter.

In some examples, combining the filtered signals into the single combination signal includes determining signal and noise powers of each filtered signal; and directing the filtered signals having the largest signal power or lowest noise power to the analog-to-digital converter. In some examples, the signal powers of each filtered signal comprise signal-to-noise ratios of each filtered signal.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure.

DETAILED DESCRIPTION

The present technology is directed to apparatuses, systems, and methods for improving the performance of non-contact vibrometers in the presence of platform motion and speckle noise. In addition, systems and methods are described that allow intentional frequency displacement of heterodyne and/or homodyne vibrometer returns to enable disambiguation of the sign of the vibration direction in the presence or absence of platform motion.

Specific details of several examples of the present technology are described below with reference to FIGS. 1-5. Additionally, several other embodiments of the technology can have different configurations, components, or procedures than those described herein. A person of ordinary skill in the art, therefore, will accordingly understand that the technology can have other embodiments with additional elements and that the technology can have other embodiments without several of the features shown and described below with reference to FIGS. 1-5.

The techniques introduced herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, ROMs, random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

Terminology

Brief definitions of terms and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

If the specification states a component or feature "may", "can", "could", or "might" be included or have a characteristic, that particular component or feature is not required to be included or have the characteristic.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded.

General Description

Figure 1:
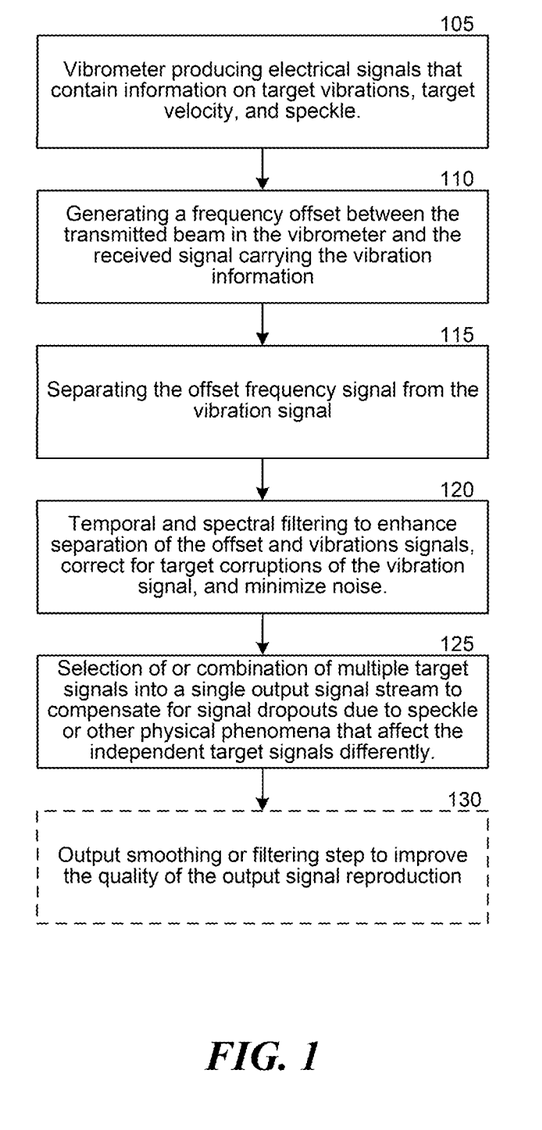
FIG. 1 shows an arrangement of the operations of a vibrometry system in a high-level flowchart.

The systems and methods herein disclosed address all the aforementioned vibrometer signal distortions and degradations affecting vibrometers of all types, and additionally allow homodyne architecture vibrometers to disambiguate the Tr phase ambiguity about zero platform velocity. The techniques described herein include the operations shown in FIG. 1. The last three operations shown in FIG. 1 provide various performance enhancements in combination with the first three operations. FIG. 1 shows an arrangement of the operations of a vibrometry system in a high-level flowchart.

At step 105, a vibrometer passively or actively illuminating a target, and uses homodyne, heterodyne, or other detection methods to convert received optical signals containing target vibrations encoded as phase or frequency, into electrical signals.

At step 110, a frequency offset of the received signal is generated relative to the transmitted signal optical frequency. Such a frequency offset may be due to intentional or unintentional Doppler shift caused by platform motion, intentional modulation of the path length between the vibrometer and the target, or intentional modulation of the illumination source or reference source to create a frequency difference between the two.

At step 115, the offset frequency signal is separated from the target vibration signal by analytical processes, as described further herein.

At step 120, spectral and temporal filters enhance the rejection of noise and Doppler interference by enhancing elements of the separation implemented in step 115. In addition, the spectral and temporal filters sculpt the bandpass of the resultant vibration signal path to minimize noise and compensate for target spectral characteristics, such as when the target vibration is secondary to, and is excited by, an external or transmitted sound source.

At step 125, multiple independent signal channels are combined to mitigate the amplitude and phase noise introduced by speckle and other dropouts in the signal. The signal channels are combined by using averaging, or by using selection based on the peak signals, noise power, signal-to-noise ratios (SNRs), or other signal-based analysis.

At step 130, amplitude or phase of the signal channels may optionally be controlled to maximize resultant signal continuity when switching between or combining the signal channels, as might be useful for e.g. voice or music reproduction.

Figure 2A:
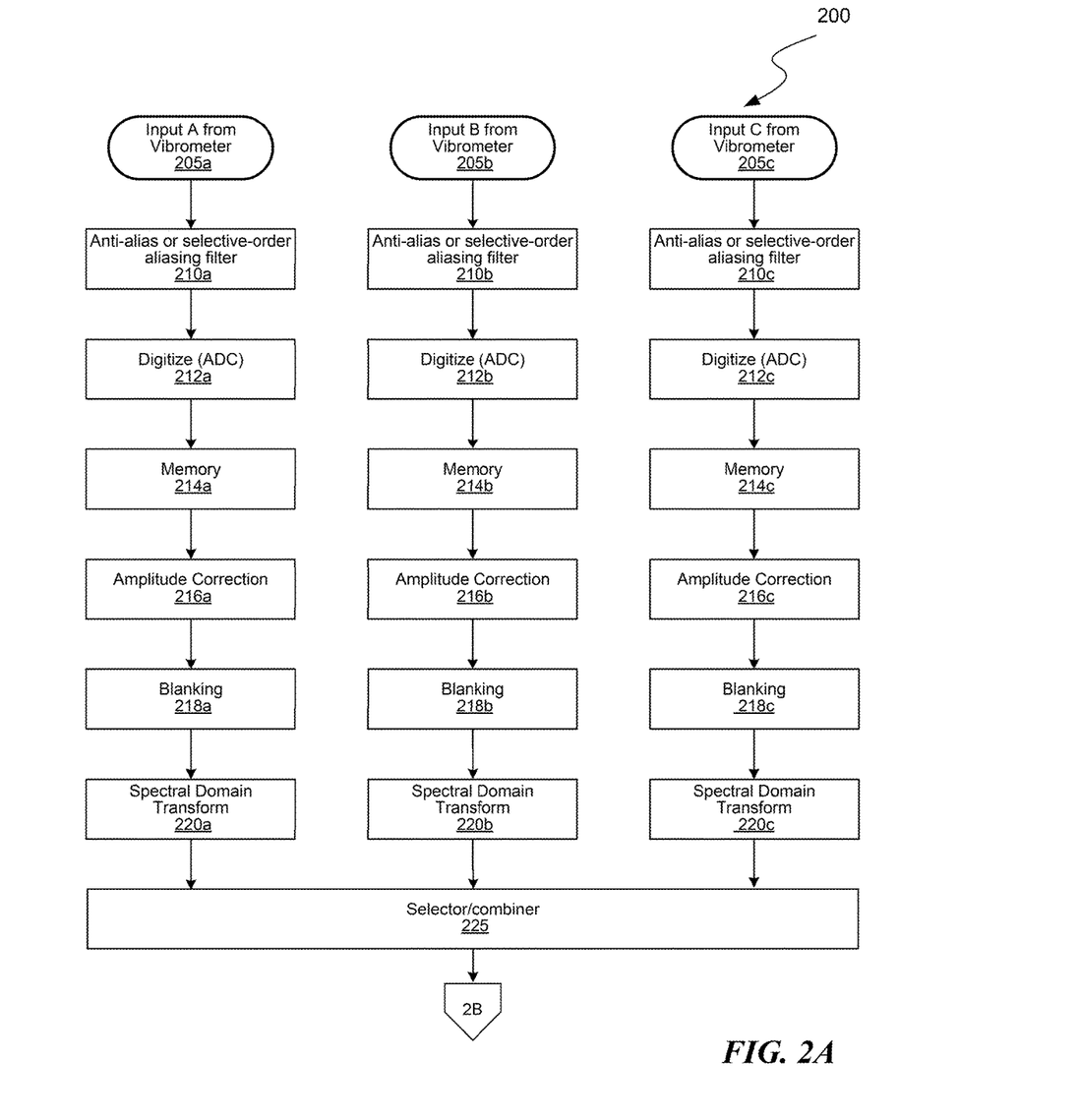
FIGS. 2A and 2B show an embodiment of a processing system that implements one or more of the operations of FIG. 1.

FIG. 2A shows a preferred embodiment of a processing system 200 that implements one or more of the operations of FIG. 1. An optical vibrometer of homodyne architecture is assumed for this discussion but does not limit other system architecture application.

Signals 205A, 205B, and 205C from one or more vibrometers are input to the processing system outlined in FIG. 2A. The signals 205A, 205B, and 205C may, in addition to desired target vibration signals, contain intentional or unintentional frequency offsets due, for instance, to the line-of-sight component of platform motion, frequency-modulated continuous-wave-like (FMCW-like) frequency modulation of a transmitted beam to a remote target, optical interference (beating) between a received signal and a reference beam, or other intentional or unintentional phenomena. The signals 205A, 205B, and 205C may also have dropouts or phase noise due to, for instance, interruptions of the line-of-sight path between the vibrometer and the target affecting one or more signal paths, speckle fading of the return in one or more paths, target surface reflectivity modulations or breaks, etc.

FIG. 2A shows three independent signal processing paths, one for each vibrometer signal (which may be from separate vibrometers, or from a multi-beam single vibrometer), each identified with a letter A, B, or C. Because these paths function identically, only path A will be followed for the following description. However, it should be understood that the same description applies equivalently to paths B and C.

Signal 205A from a vibrometer or a vibrometer's detector amplifiers, is passed to filters 210A, which may provide conventional anti-alias function (i.e. that the filter is low pass with a cutoff frequency less than two times the subsequent digitizer sampling clock frequency), or it may be a bandpass filter set to select a specific aliasing order, allowing digitization at a decimated clock rate to minimize digitizer and processing requirements. The latter technique is particularly useful where the vibration signal has a bandwidth much less than the frequency offset, such as when the vibrometer is used to detect vibration from or to a moving vehicle, or where the FMCW range-dependent frequency offset is largely due to extended range, or intentionally large to avoid low frequency noise energy.

An alternative method for reducing the processing bandwidth is to precede the anti-alias filter 210A with a conventional analog down-mixer step. In either case, the filter bandpass may be dynamically adjusted (along with the later digitizer clock rate, if necessary) depending on the actual target frequency anticipated or measured externally, or measured as a byproduct of later steps in the processing system 200.

Signals passing the filter 210A are digitized by analog to digital converter 212A, the digital output of which enters a memory 214A such as RAM. The purpose of memory 214A is to allow digitization to proceed at a fixed clock rate (the fixed clock rate may be dynamically adjusted from time to time to accommodate the input bandwidth), until a select number of sequential data samples has been assembled matching the select size of the transforms in the following steps (for example, 1024 samples for a 1024 point transform). The memory 214A may have multiple areas that alternately accumulate data so that, for efficiency and speed, transforms may take place in one area while data is accumulated for the next transform in another area.

Data in the memory 214A are then subject to amplitude correction at 216A. This step is particularly useful when, for example, the input signal varies greatly due to phenomenology, in which case the function is like that of an automatic gain control (AGC), or when, as a consequence of vibrometer laser modulation (such as when current modulation of a semiconductor laser is used to implement FMCW operation) that has a fixed known impact on the signal return power. In the latter case, a signal from the laser modulator can be used to deterministically correct the signal amplitude. This step may improve the dynamic range of the processing, especially where numerical noise may be introduced in later transform steps, or where the laser current modulation waveform or its harmonics bleed into the signal bandpass.

Following amplitude correction, a blanking process 218A takes place that cuts out or replaces portions of the signal that are corrupted due to the finite turn-around time of cyclic laser modulation waveforms. The locations of data from these brief time segments are known either through monitoring the modulation waveform, by synchronous system design, or by detecting them in the data stream asynchronously. Following blanking, the time domain data, which may have been operated on in place in memory 214A by the preceding processing steps, is transformed into the spectral domain by Spectral Domain Transform 220A. The most common method for accomplishing this is the Fast Fourier Transform (FFT), but other methods could be used to achieve the similar vibration signal separations.

Following the spectral transform, in this embodiment, the corresponding signals are analyzed in selector/combiner 225. The purpose of this step is to select and provide the best combinations of signals from the independent vibrometer measurements into a single output signal to mitigate the effects of speckle, signal dropouts, or other signal degradation effects on the process signal output while minimizing the downstream processing requirements. This step can, for example, use the highest peak power signal, lowest noise power, or the highest peak power spectral density compared to the spectral noise floor to select the largest, or some combination (such as phased sum of the best), SNR signal channels and direct those on for further processing.

Figure 2B:
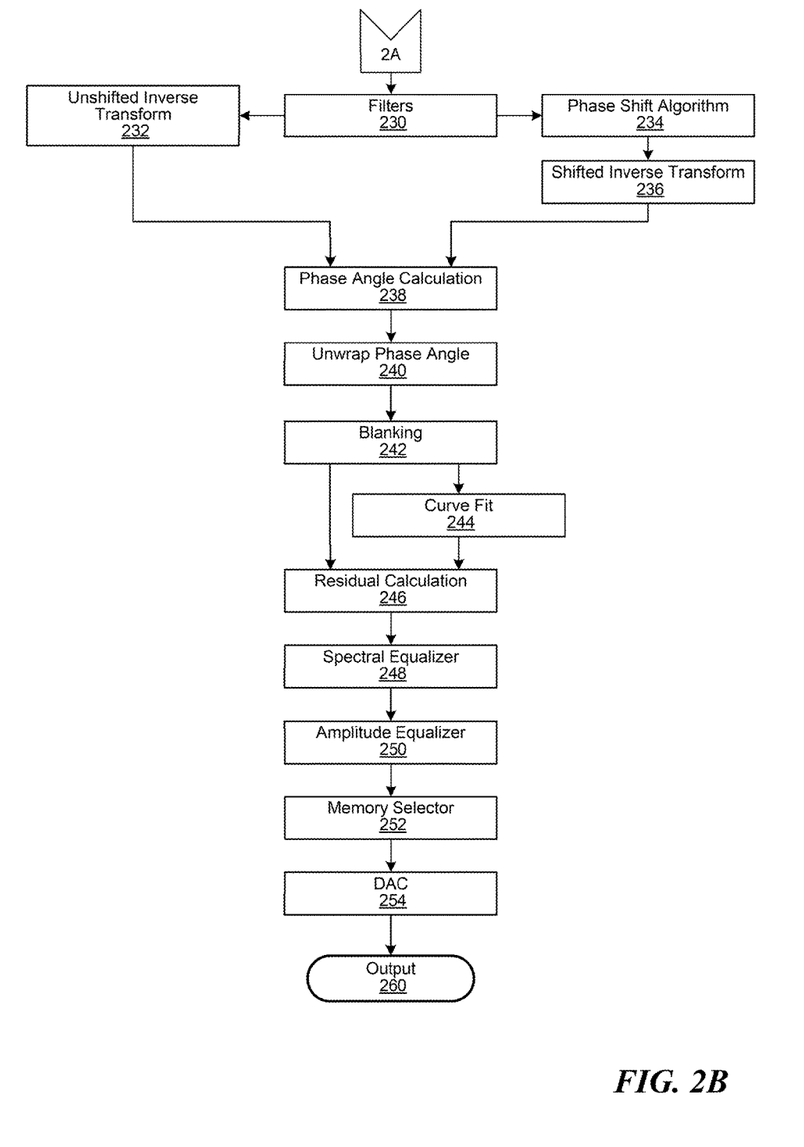

The processing system 200 continues in FIG. 2B. The output of the selector/combiner 225 is passed to filters 230. In the spectral domain, spectral filter implementation is greatly facilitated, and can be very efficiently implemented by multiplying the spectral elements by spectral weighting coefficients at each frequency to eliminate undesireable noise and interference components (e.g. set coefficient for that frequency channel to 0), or accentuate critical desirable signal components (set coefficient for that frequency channel >1). After spectral filtering and sculpting, the signal is split into two paths. One path goes directly to an Unshifted Inverse Transform 232 that restores the now filtered time domain signal, the other signal path subjects the signal to a phase shift algorithm 234 that calculates a frequency-by-frequency phase orthogonal version of the filtered spectral signal. After the filter and phase shift, the signal goes to the Shifted Inverse Transform 236. Assuming FFT-based processing, the output of this step is an equivalent time series to that output by Inverse Transform 232, but where the individual spectral components are shifted by 90 degrees in phase.

Signals output by 232 and 236 are then combined in Phase Angle Calculation 238 where the instantaneous phase-angle time series is generated. Assuming the transform outputs represent sine and cosine phase shifted versions of the input time series, as is the case here, then the arctangent of the ratio of these signals at each time in the series represents the instantaneous phase angle of the time series signal. Since the phase angle repeats on $2\pi$, and the phase is continuously advancing due to the frequency offset in the signal, these angles must be unwrapped in 240 into a continuous function, as is well-known in the art.

The resulting continuous time angle function is then fit to a line by a linear or non-linear fitting process. The order and complexity of the fit process depends on the complexity of the signals and their relative spectral content. This step allows accurate separation of the offset frequency and the vibration signals. Each point on the line fit represents the integral of angular frequency of the offset frequency, while deviations from the line fit represent the instantaneous frequency perturbations of the angular frequency about the line fit, which are due to the target vibrations. The residual time series is calculated in 246 (by subtracting the line fit from the unfit signal) and represents the separated vibration signal which is then passed to Spectral Equalizer 248.

The slope of the line fit itself carries the information about the offset frequency and can be useful in optimizing the bandwidth selection for the system as previously described. In addition, in the case where the laser is scanned in frequency, this rate can be averaged to provide a measure of range, or separately averaged for up and down frequency chirp segments of the scanning waveform to indicate range and Doppler velocity in a manner well known in the art for FMCW ranging radar and lidar.

Returning to FIG. 2B, the spectral equalizer 248 provides final spectral sculpting of the vibration signal bandpass. This step is particularly advantageous when the vibrating target is secondary to or excited by the vibration source of interest, such as with a passive object target that is air or direct coupled to a human or electro-mechanical speaker. This is the typical case where, for instance, the system is hand-held or vehicle-mounted, and used to remotely monitor a conversation in the vicinity of, e.g., a paper cup or a wall hanging or picture. In these cases, the target sympathetically vibrates in response to excitation by the utterances of the conversants, and the target vibration is subsequently monitored by the system that separates the vibrations from the motion-induced signal disturbances. In this case, the Spectral Equalizer 248 can compensate for spectral degradation (or echoes) caused by the spectral compliance of the secondary target or the environment in between the primary and secondary source. In some examples, an additional deconvolution step may be added to the Spectral Equalizer 248 for echo removal. The signal is then passed to an Amplitude Equalizer 250 that can provide final mitigation of target, environmental, or signal processing effects that affect the amplitude of the signal, or provide compression of dynamic range to improve, e.g., signal recognition quality. The processed separated vibration signal is then addressed by Memory Selector 252 that selects the sequentially data words representing the processed signal amplitude and delivers them to the digital to analog converter (DAC) 254, with continuous output of the separated and processed vibration signal at 260 at a rate proportional to the input digitizer 212A rate (although perhaps delayed in time), to effect continuous processing throughput of the system 200.

One skilled in the art may also recognize that, for some applications where the spectral separation of the vibration signal from the platform Doppler disturbances is great, the line fitting and residual separation steps can equivalently be implemented using a high pass filter to isolate the vibration components, and a low pass filter to isolate the Doppler signals.

Figure 2C:
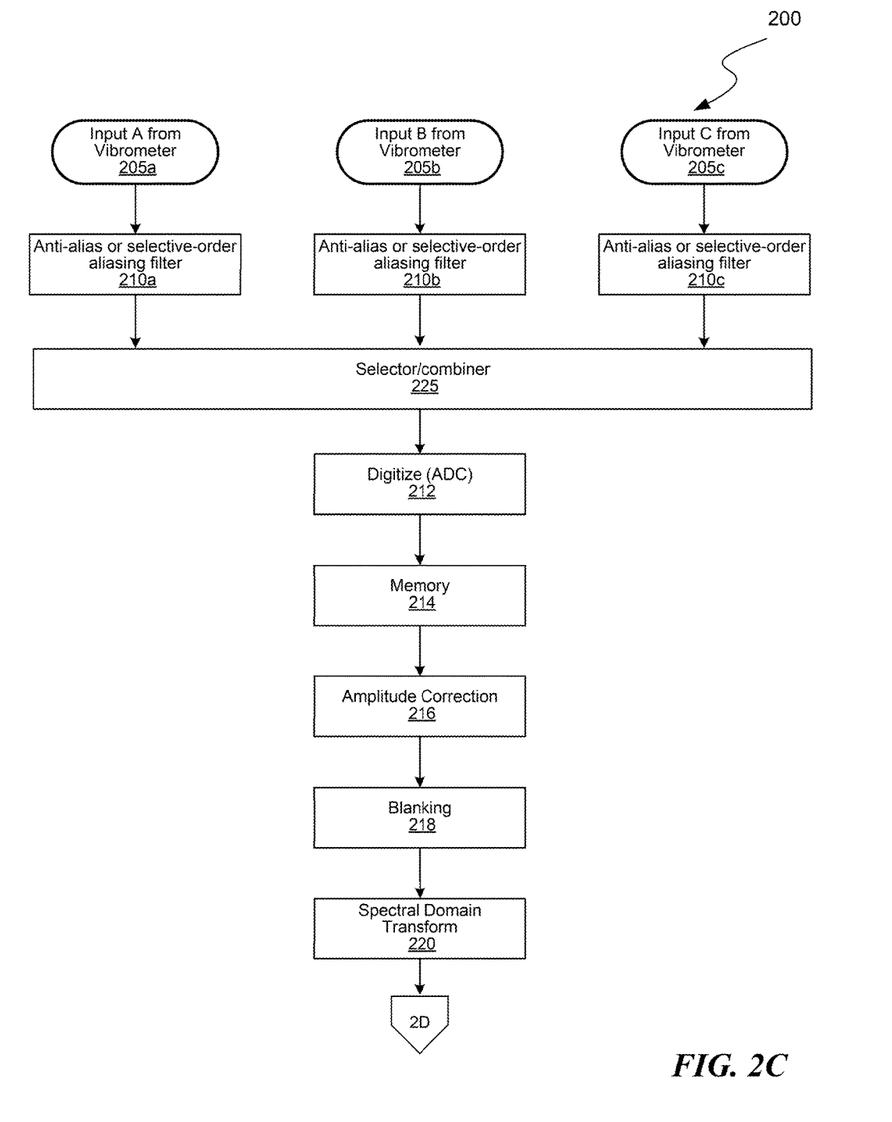
FIGS. 2C and 2D show an alternate embodiment of a processing system that implements one or more of the operations of FIG. 1.
Figure 2D:
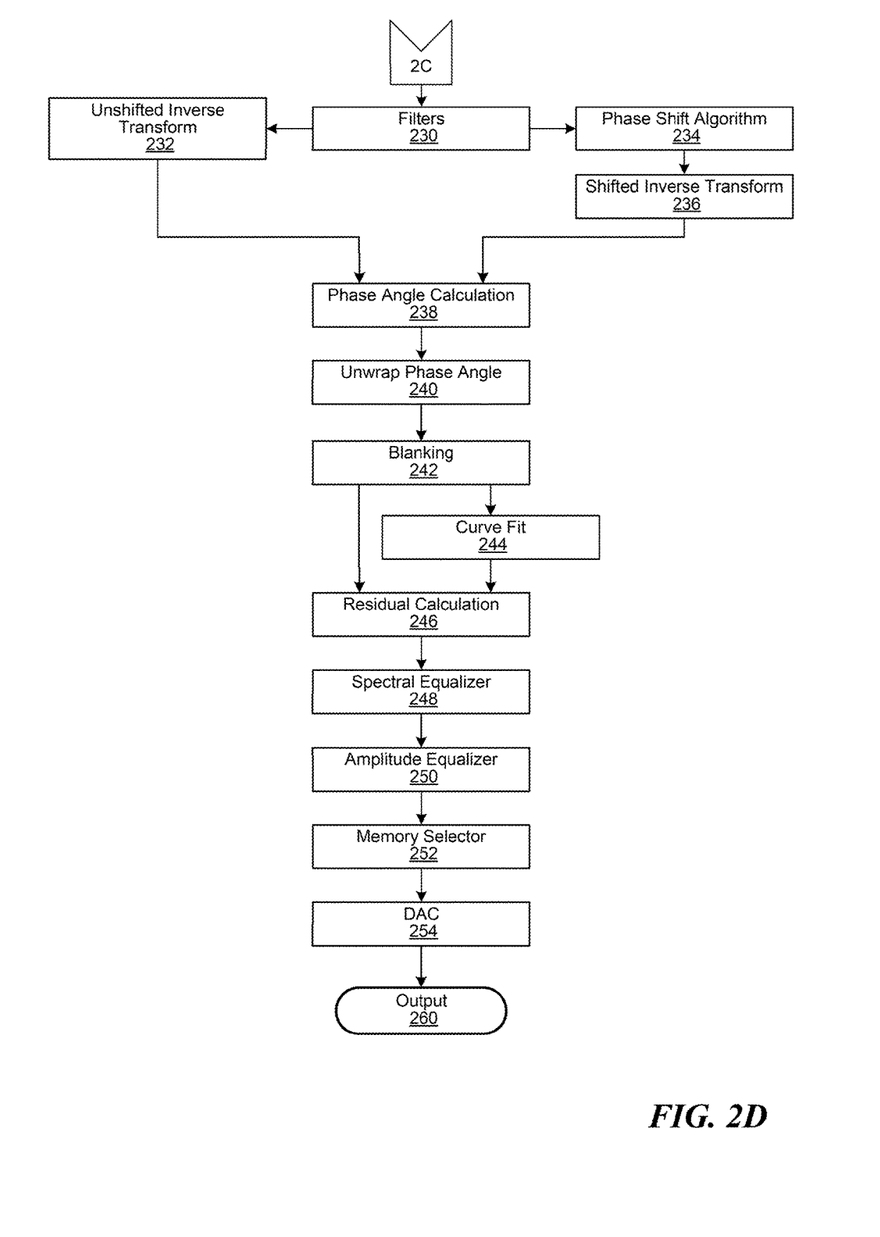

In alternative embodiments, the stage at which preselection of the best channel, or combinations of channels, may be altered to optimize the system for either best results or minimum resource usage. FIGS. 2C and 2D illustrate an embodiment of the minimum resource method, which makes an estimate of the signal power in each channel before digitization. In some embodiments, the power estimation may be implemented with a rectifier and a low pass filter. The selector/combiner 225 step is then moved to between anti-alias filters 210A, B, and C, and Digitizer 212A. The signal powers (or SNR's) are compared in the analog domain, and the best signals selected with an analog switch and directed to the digitizer 212A, with subsequent operation of the signal chain 212A-220A inclusive as previously described. The signal is then passed directly to filter 230, with subsequent operations through the output as previously described. Blocks 212B-220B and 212C-220C of FIGS. 2A and 2B are not implemented in this embodiment.

Figure 2E:
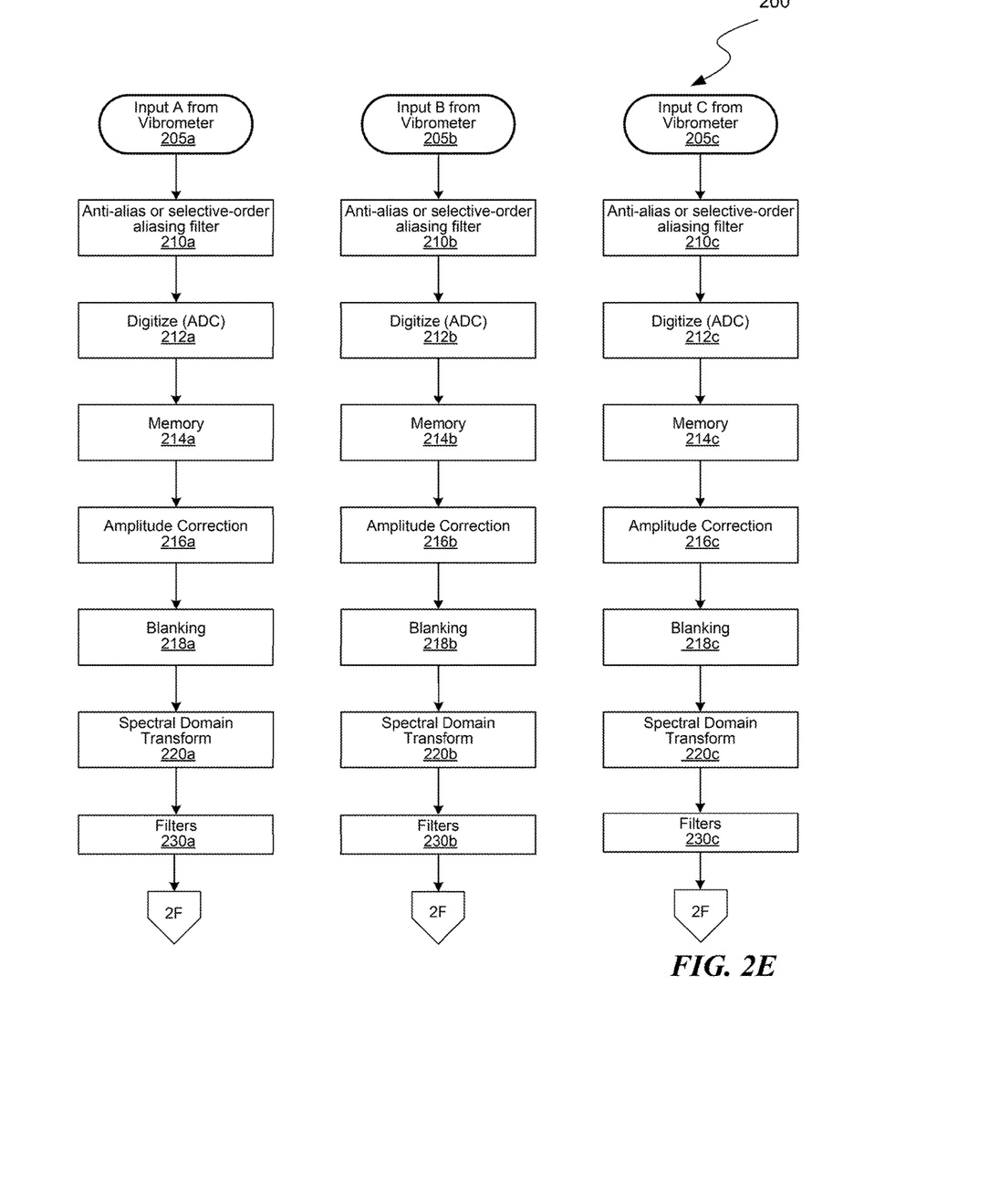
FIGS. 2E and 2F show another alternate embodiment of a processing system that implements one or more of the operations of FIG. 1.
Figure 2F:
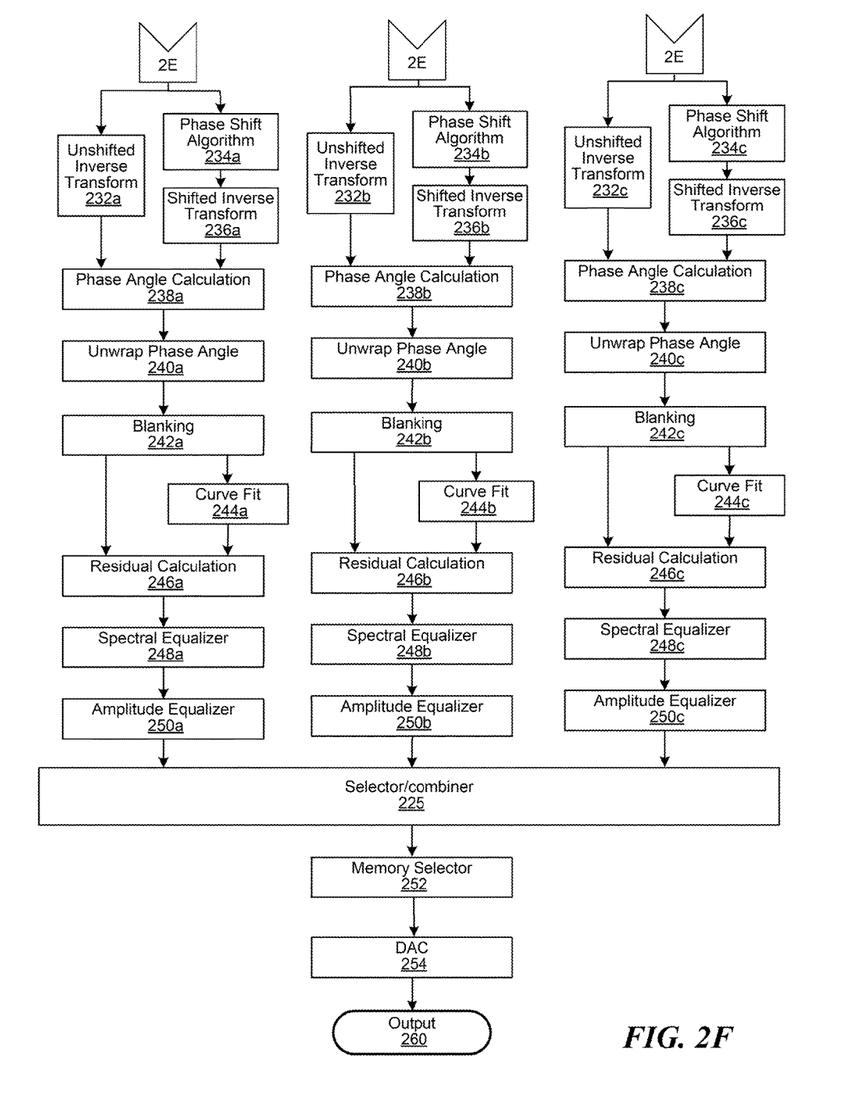

FIGS. 2E and 2F illustrate an embodiment of the maximum performance method, which moves the selector/combiner 225 to after Amplitude Equalizer 250, and the entire processing chain 230-250 shown in FIGS. 2A and 2B is repeated independently for each channel so that the selection of the output channel or combination of channels is executed based on the quality of each channel's fully retrieved vibration signal.

It should be noted that other embodiments are similarly possible, depending on the desired optimizations for a given application.

Figure 3:
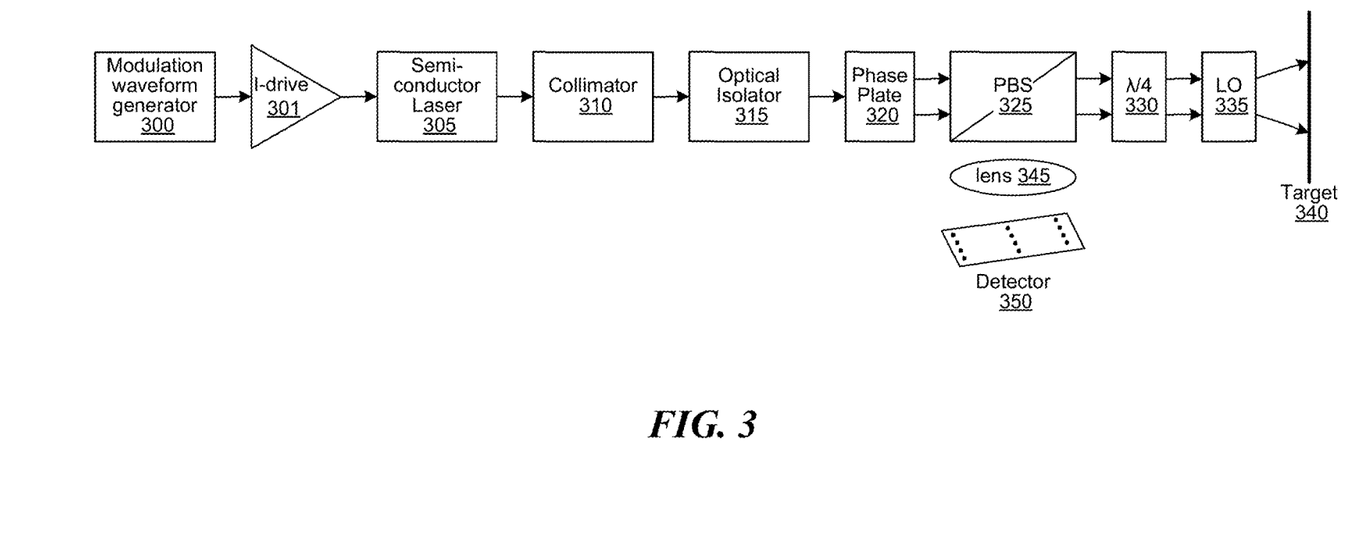
FIG. 3 shows an example of means for generating intentional frequency offset of a vibration signal in vibrometers.

FIG. 3 shows an example of means for generating intentional frequency offset of the vibration signal in vibrometers employing semiconductor lasers and implementing homodyne architectures, including multibeam homodyne architectures. Together with the operations described in FIG. 1, the intentional introduction of an offset frequency extends the unambiguous function of homodyne vibrometers to all conditions of platform motion including the static and small motion cases. In this approach, the platform motion Doppler frequency simply adds or subtracts from the induced frequency offset, and the operation of the signal processing as described in FIG. 1 is transparent and unaffected (with the exception of additional bandwidth requirements to accommodate the additional frequency shift). This is a preferred embodiment of the vibrometer as described in step 105 of FIG. 1.

A modulation waveform generator 300 causes a controlled variation of the current supplied from current driver 301 to semiconductor laser 305. In addition to power output, it is well known in the art that the optical frequency of a semiconductor laser is a function of the current driving the laser. Therefore a select waveform modulating the current to the laser can cause the laser to chirp in a controlled way, implementing the desired frequency modulation. The remaining structure of this multi-beam homodyne vibrometer is the subject of pending patent application Ser. No. 13/767,288, incorporated herein by reference as if set out in full.

To be effective for vibrometry, the laser has to be substantially single frequency on time scales consistent with the time it takes light to propagate from the laser to the target and return at the maximum operating range as indicated by a coherence length several times the maximum range. The output of laser 305 is collimated by lens 310, and passed through an optical isolator 315 to prevent back reflections from adversely affecting the laser stability. The beam output from the isolator 315 passes through a phase plate 320 that converts the single beam into multiple overlapping beams each imparted a distinctly different beam angle relative to the input beam by the phase plate. The multiple beams pass through a polarization beam splitter 325, a quarter-wave waveplate 330, and a local oscillator (LO) beam sampling mirror 335, and on to remote target 340. A small amount of the light (specularly or diffusely) scattered from the target returns through the mostly transparent LO 335 where it interferes with the outgoing beams reflected back toward the laser from the LO 335. In passing back through the waveplate 330, the polarization state is rotated to be orthogonal to the outgoing beams. This polarization of light is reflected by the PBS into the lens 345, which casts images of the reflected LO beams mixed with return light from the target onto an array of one or more detectors 350.

The detectors convert the intensity of the light to electrical signals. It is presumed that the electrical signals from the detectors 350 are amplified with suitable gain, bandwidth and filtering to be accepted as useful input to the system outlined in FIGS. 2A and 2B. Since the optical intensity in each mixed beam depends on the relative phase of the reference LO and target return beams, the electrical output of each detector is proportional to that relative phase. If the target is vibrating, the corresponding detector signal is also time-varying with a frequency that is sinusoidally oscillating about a DC level related to the LO power, in proportion to the target velocity. If the target is moving in a consistent direction, then the electrical signal has a frequency proportional to the line of sight velocity. If the laser is ramping in frequency, then at any time the optical frequency returning from the target is also offset in frequency in proportion to the time of flight for light from the vibrometer to the target and back, and also to the rate at which the laser output frequency is being ramped. Thus, the detected frequency is also a function of the range to the target. This is consistent with the well-known FMCW ranging technique.

In the present disclosure, a specific frequency is not considered, as long as it is sufficient to exceed any expected platform motion Doppler offsets, and also the effective frequency/phase modulation bandwidth due to the target vibration (a function of the vibration frequency and the amplitude of the target vibration, also known as the modulation index). The waveform generator should be set to achieve at least the minimum required frequency offset at the minimum expected target range. Alternatively, the target range can be extracted from the offset frequency that can be determined as a byproduct of the signal processing algorithm, and used to adjust the waveform ramp rate dynamically to effect a minimum bandwidth requirement system.

The signals from the detectors are directed to the processing system 200 described in FIG. 2. Likewise, the waveform generator output can be useful in optimizing the processing system performance and may be output to the processing system 200.

Figure 4A:
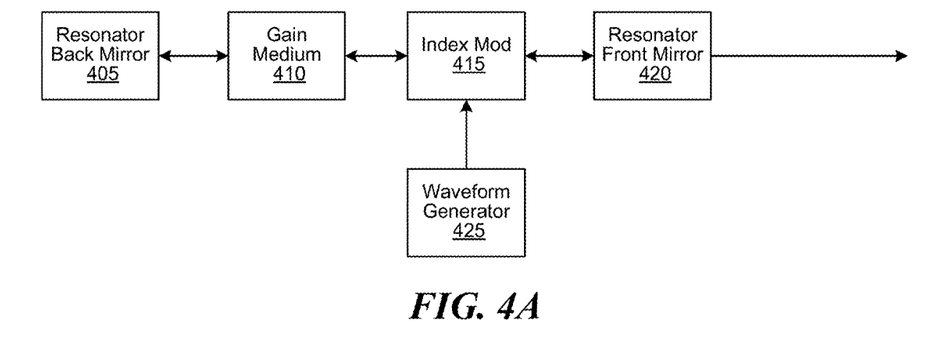
FIGS. 4A and 4B show two architectures that use internal cavity and external-to-cavity frequency chirp generation as alternatives to the semiconductor current modulation method of FIG. 3.
Figure 4B:
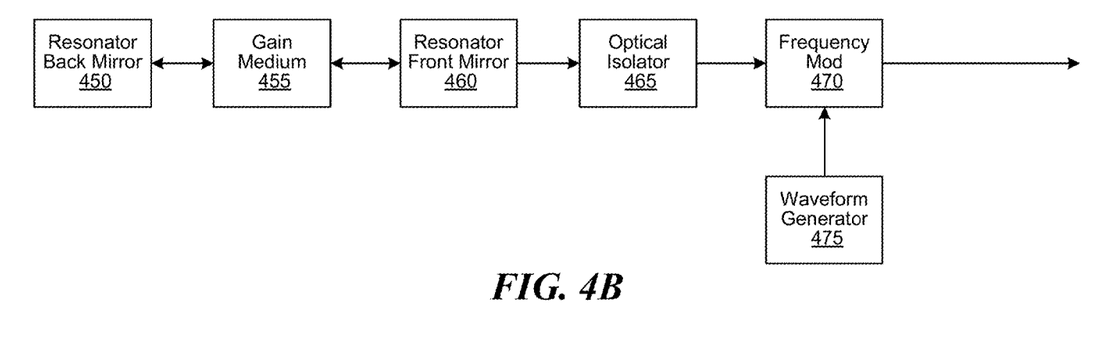

FIGS. 4A and 4B show two architectures that use internal cavity and external-to-cavity frequency chirp generation as alternatives to the semiconductor current modulation method of FIG. 3 used to intentionally generate frequency offset. The advantage of these methods is that they do not disturb laser amplitude or frequency stability and can be implemented with any type of laser.

In FIG. 4A, a typical laser having a resonant cavity determined by resonator mirrors 405 and 420, has a gain medium 410 that has sufficient gain per pass to overcome cavity losses and sustains oscillation. Between the gain medium and one of the resonator mirrors, an electro-optic device may be inserted that allows modulation of its index of refraction, thereby enabling electrical adjustment of the laser cavity length and hence the laser resonant frequency. Alternatively, the function of the modulator 415 and the mirror 420 can be combined into an electrically tunable mirror by methods known in the art, for example, for implementing distributed Bragg reflectors (DBR) as tunable elements in semiconductor lasers. A waveform generator 425 provides electrical output suitably conditioned to implement selective control of the index of refraction of 415. A ramp or triangle waveform signal of appropriate voltage from the waveform generator 425 will therefore produce a ramp change in the laser output frequency, thereby effecting the desired laser frequency chirp to implement the FMCW architecture.

FIG. 4B shows a similar functional arrangement but where the frequency modulation occurs external to the laser cavity. A laser formed by resonator mirrors 450 and 460 and interspersed gain medium 455. The output beam from the laser may pass through an optical isolator 465, if needed, that prevents back reflections from affecting the laser operation. A frequency modulator, such as an acousto-optic modulator (AOM), receives the beam from the isolator 465 and shifts its frequency according to a modulation waveform from the waveform generator 475. In this case, the generator 475 provides a ramp frequency equal to the desired offset frequency, thereby effecting the desired laser frequency chirp to implement the FMCW architecture. An AOM typically also deflects the optical beam in proportion to the offset frequency, but special AOM arrangements are known in the art that can compensate this effect. This method is preferred where the laser coherence length must be maximized to effect longest range and lowest noise operations.

General Notes

This description assumes an architecture for the processing system 200 that is intended to be real time, where signals are continuously acquired from the vibrometers, processed, and output as a continuous stream of separated vibration signals stripped of offset frequencies and mitigated for speckle and dropouts. In an alternative embodiment, the processing system 200 may be operable on raw unprocessed recorded data from vibrometers, or data transmitted wirelessly or through wires, or optical fibers from a remote location in real time or at any time later. Also, the processing system can proceed at any rate faster or slower than the input, as may be optimal for particular applications. Three vibrometer channels are shown, but any number of channels may be simultaneously employed. In the case of one channel, only speckle and dropout mitigation are rendered inoperable, but the separation of frequency offsets from vibrations signals, and the artificial generation of an offset carrier frequency for the target vibrations useful for homodyne vibrometers is still fully operable.

In addition, the methods and apparatus described herein are similarly applicable to vibration imaging.

Exemplary Computer System Overview

Figure 5:
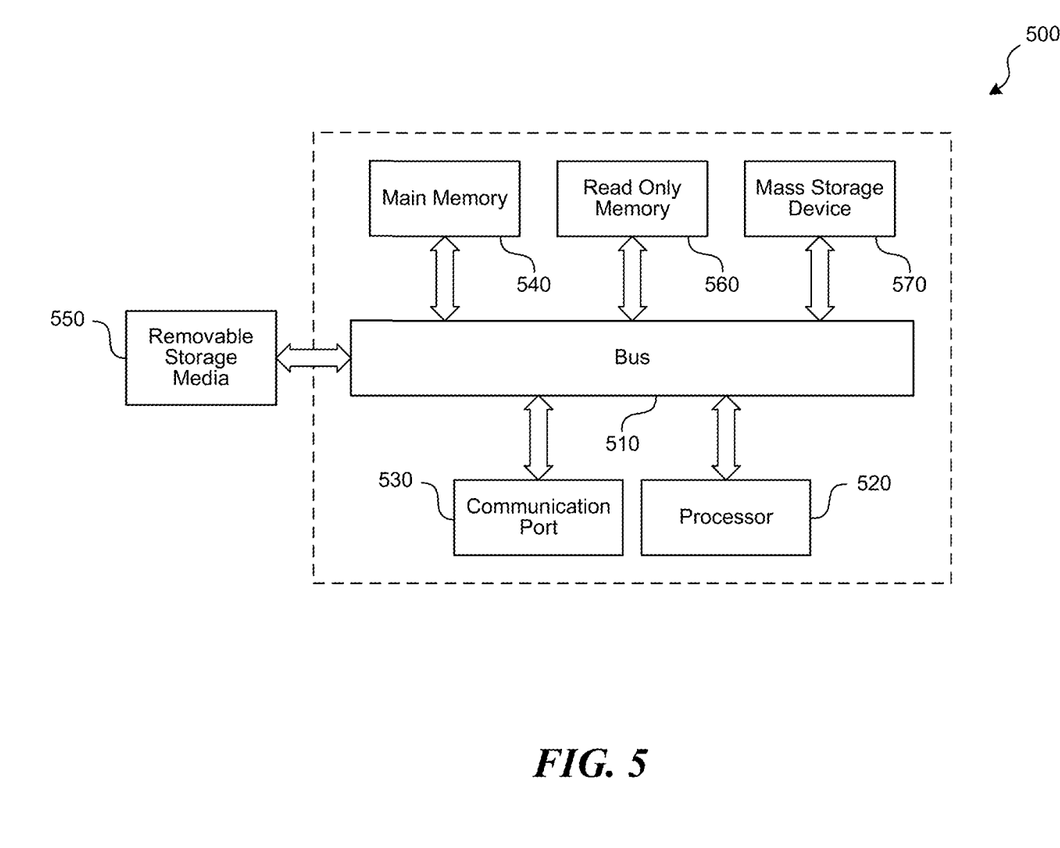
FIG. 5 is an example of a computer system with which embodiments of the present technology may be utilized.

Embodiments of the present technology include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 5 is an example of a computer system 500 with which embodiments of the present technology may be utilized. According to the present example, the computer system includes a bus 510, at least one processor 520, at least one communication port 530, main memory 540, a removable storage media 550, a read only memory 560, and a mass storage 570.

Processor(s) 520 can be any known processor, such as, but not limited to, Intel® lines of processor(s); AMD® lines of processor(s); or application-specific integrated circuit(s) (ASICs). Communication port(s) 530 may be chosen depending on a wired or wireless network such as a Local Area Network (LAN), Wide Area Network (WAN), cellular network, or any network to which the computer system 500 connects.

Main memory 540 can be Random Access Memory (RAM) or any other dynamic storage device(s) commonly known in the art. Read only memory 560 can be any static storage device(s) such as Programmable Read Only Memory (PROM) chips for storing static information such as instructions for processor 520.

Mass storage 570 can be used to store information and instructions. For example, hard disks, SCSI drives, an optical disc, an array of disks such as RAID, or any other mass storage devices may be used.

Bus 510 communicatively couples processor(s) 520 with the other memory, storage and communication blocks. Bus 510 can be a PCI/PCI-X or SCSI-based system bus depending on the storage devices used.

Removable storage media 550 can be any kind of external hard-drives, floppy drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the technology, as they are only exemplary embodiments.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. The various embodiments described herein may also be combined to provide further embodiments. All references cited herein are incorporated by reference as if fully set forth herein.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. A method for processing signals associated with a plurality of vibrometry beams, comprising:
filtering each signal with a plurality of anti-aliasing filters;
digitizing each signal with a plurality of analog-to-digital converters;
applying amplitude correction to each digitized signal;
removing portions of each digitized signal that are corrupted;
transforming each digitized signal to a spectral domain;
combining the spectral domain signals associated with the plurality of vibrometry beams into a single combination signal, wherein the spectral domain signals are combined to mitigate signal degradations;
filtering the combination signal with a spectral domain filter;
transforming the combination signal with an unshifted inverse transform to generate an unshifted time domain combination signal;
applying a phase shift to the combination signal;
transforming the phase-shifted combination signal with a shifted inverse transform to generate a shifted time domain combination signal, wherein the shifted time domain combination signal includes spectral components shifted 90 degrees in phase from the unshifted time domain combination signal;
generating an instantaneous phase angle time series based on the unshifted time domain combination signal and the shifted time domain combination signal;
unwrapping the instantaneous phase angle time series to generate a continuous time-angle series;
isolating vibration components of the time-angle series;
generating a separated vibration signal based at least in part on the isolated vibration components;
processing the separated vibration signal with a spectral equalizer and an amplitude equalizer;
converting the processed vibration signal to an analog vibration signal with a digital-to-analog converter; and
outputting the analog vibration signal.

2. The method of claim 1, wherein the step of isolating vibration components comprises fitting the continuous time angle series to a line, wherein each point on the line represents an integral of angular frequency of an offset frequency and deviations from the line represent instantaneous frequency perturbations of the angular frequency about the line due to target vibrations.

3. The method of claim 2, wherein the step of generating the separated vibration signal comprises subtracting the portions of the continuous time angle series fit to the line from the portions of the continuous time angle series not fit to the line.

4. The method of claim 1, wherein the step of isolating vibration components comprises filtering with a high pass filter to isolate vibration components, and filtering with a low pass filter to isolate Doppler signals.

5. The method of claim 1, wherein the signals associated with the plurality of vibrometry beams comprise target vibration signals and one or more of intentional frequency offsets and unintentional frequency offsets.

6. The method of claim 5, wherein the one or more of the intentional frequency offsets and unintentional frequency offsets are due to at least one of a line-of-sight component of platform motion, frequency-modulated continuous-wave-like frequency modulation of a transmitted beam to a remote target, optical interference between a received signal and a reference beam, or a combination thereof.

7. The method of claim 1, wherein at least one of the signals associated with the plurality of vibrometry beams comprise one or more of dropouts and phase noise due to at least one of an interruption of a line-of-sight path between at least one vibrometer and a target, speckle fading of a return in one or more signal paths, target surface reflectivity modulations, or a combination thereof.

8. The method of claim 1, wherein the plurality of vibrometry beams are generated by separate vibrometers or a single, multi-beam vibrometer.

9. The method of claim 1, wherein the plurality of vibrometry beams detect vibration of a moving vehicle.

10. The method of claim 1, wherein the amplitude correction applied to each digitized signal is based at least in part on a signal from a laser modulator.

11. The method of claim 1, wherein the corrupted portions of each digitized signal are due to finite turn-around time of cyclic laser modulation waveforms and wherein the corrupted portions of each digitized signal are detected by monitoring the modulation waveforms.

12. The method of claim 1, wherein the corrupted portions of each digitized signal are detected by monitoring signal waveforms.

13. The method of claim 1, wherein the step of combining the spectral domain signals into the single combination signal comprises:
   determining signal-to-noise ratios of each spectral domain signal by comparing one or more of a spectral noise floor, a highest peak power signal, and a highest peak power spectral density; and
   selecting portions of each spectral domain signal with a largest signal-to-noise ratios or lowest noise for the combination signal.

14. The method of claim 1, wherein the step of filtering the combination signal with the spectral domain filter comprises:
   multiplying spectral elements of the combination signal by spectral weighting coefficients at each frequency to eliminate undesirable noise and interference components or accentuate critical desirable signal components.

15. The method of claim 1, wherein the plurality of anti-aliasing filters are configured based at least in part on a slope of the line.

16. The method of claim 1, wherein the step of processing the separated vibration signal with the spectral equalizer compensates for spectral degradation caused by a secondary target or an environmental effect.

17. The method of claim 16, wherein the secondary target is coupled to at least one of a human or an electro-mechanical speaker.

18. A method for processing signals associated with a plurality of vibrometry beams, comprising:
   filtering each signal with a plurality of anti-aliasing filters;
   combining the filtered signals into a single combination signal, wherein the filtered signals are combined to mitigate signal degradations;
   digitizing the combination signal with an analog-to-digital converter;
   applying amplitude correction to the digitized combination signal;
   removing portions of the digitized combination signal that are corrupted;
   transforming the digitized combination signal to the spectral domain;
   filtering the spectral domain combination signal with a spectral domain filter;
   transforming the spectral domain combination signal with an unshifted inverse transform to generate an unshifted time domain combination signal;
   applying a phase shift to the spectral domain combination signal;
   transforming the phase-shifted combination signal with a shifted inverse transform to generate a shifted time domain combination signal, wherein the shifted time domain combination signal includes spectral components shifted 90 degrees in phase from the unshifted time domain combination signal;
   generating an instantaneous phase angle time series based on the unshifted time domain combination signal and the shifted time domain combination signal;
   unwrapping the instantaneous phase angle time series to generate a continuous time angle series;
   isolating vibration components of the time-angle series;
   generating a separated vibration signal based at least in part on the isolated vibration components;
   processing the separated vibration signal with a spectral equalizer and an amplitude equalizer;
   converting the processed vibration signal to an analog vibration signal with a digital-to-analog converter; and
   outputting the analog vibration signal.

19. The method of claim 18, wherein the step of combining the filtered signals into the single combination signal comprises:
   determining signal powers of each filtered signal; and
   directing the filtered signals having a largest signal powers or lowest noise power to the analog-to-digital converter.

20. A method for processing signals associated with a plurality of vibrometry beams, comprising:
   filtering each signal with a plurality of anti-aliasing filters;
   digitizing each signal with a plurality of analog-to-digital converters;
   applying amplitude correction to each digitized signal;
   removing portions of each digitized signal that are corrupted;
   transforming each digitized signal to the spectral domain;
   filtering spectral domain signal with a plurality of spectral domain filters;
   transforming each spectral domain signal with a plurality of unshifted inverse transforms to generate unshifted time domain signals;
   applying a phase shift to each spectral domain signal;
   transforming each phase-shifted signal with a plurality of shifted inverse transforms to generate shifted time domain signals, wherein the shifted time domain signals include spectral components shifted 90 degrees in phase from the unshifted time domain signals;
   generating instantaneous phase angle time series based on each unshifted time domain signal and each corresponding shifted time domain signal;
   unwrapping the instantaneous phase angle time series to generate continuous time angle series;
   isolating vibration components of the time-angle series;
   generating separated vibration signals based at least in part on the isolated vibration components;
   processing each separated vibration signals with a plurality of spectral equalizers and a plurality of amplitude equalizers;
   combining the processed vibration signals associated with the plurality of vibrometry beams into a single combination signal, wherein the processed vibration signals are combined to mitigate signal degradations;
   converting the combination signal to an analog vibration signal with a digital-to-analog converter; and
   outputting the analog vibration signal.

* * * * *